United States Patent
Rigosi (12)

(10) Patent No.: US 6,461,703 B1
(45) Date of Patent: Oct. 8, 2002

(54) POLYPROPYLENE COMPOSITIONS WITH A HIGH CONTENT OF HEAVY MINERAL FILLERS SUITED FOR COATING METAL PIPES

(75) Inventor: Gian Luigi Rigosi, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/331,246

(22) PCT Filed: Oct. 20, 1998

(86) PCT No.: PCT/EP98/06625

§ 371 (c)(1), (2), (4) Date: Jun. 17, 1999

(87) PCT Pub. No.: WO99/21916

PCT Pub. Date: May 6, 1999

(30) Foreign Application Priority Data

Oct. 28, 1997 (IT) .......................................... MI99A2414

(51) Int. Cl.[7] .................................................. C08K 3/10
(52) U.S. Cl. ........................ 428/36.9; 428/461; 525/88; 525/89; 525/240
(58) Field of Search ............................. 428/36.9, 36.91, 428/461; 525/88, 89, 240; 524/225

(56) References Cited

U.S. PATENT DOCUMENTS

| | | | | |
|---|---|---|---|---|
| 4,128,606 A | * | 12/1978 | Furutachi et al. | ....... 260/878 B |
| 4,950,720 A | * | 8/1990 | Randall, Jr. et al. | ......... 525/322 |
| 5,494,953 A | * | 2/1996 | Rigosi et al. | ................ 524/225 |
| 5,536,349 A | * | 7/1996 | Marzola et al. | ............. 156/187 |
| 5,541,260 A | * | 7/1996 | Pelliconi et al. | ............ 525/240 |
| 5,587,436 A | * | 12/1996 | Klimek et al. | ................ 526/59 |

FOREIGN PATENT DOCUMENTS

| | | |
|---|---|---|
| DE | 2558483 | 7/1977 |
| EP | 254375 | 1/1988 |
| EP | 400333 | 12/1990 |
| EP | 472946 | 3/1992 |
| EP | 673966 | 9/1995 |
| WO | WO 97/33117 | * 9/1997 |
| WO | WO 97/40080 | * 10/1997 |

* cited by examiner

*Primary Examiner*—Harold Pyon
*Assistant Examiner*—Sow-Fun Hon

(57) ABSTRACT

Polypropylene composition comprising by weight (A) 60–90% of at least one heavy mineral filler having a specific weight greater than or equal to 3; (B) 0.1–4% of a filler compatibilizer; and (C) 10–40% of a heterophasic polyolefin composition containing rubber. Said composition has an MIL ranging from 0.5 to 10 g/10 min, elongation at break greater than 100 to 800%, and flexural modulus ranging from 100 to less than 3000 MPa.

8 Claims, No Drawings

POLYPROPYLENE COMPOSITIONS WITH A HIGH CONTENT OF HEAVY MINERAL FILLERS SUITED FOR COATING METAL PIPES

The present invention concerns polyolefin compositions with a high content of heavy mineral fillers, particularly suited for coating metal pipes by way of extrusion coating processes. It is known that polyolefins, and particularly propylene polymers, can be used satisfactorily to coat the outside surface of metal pipes to be used for pipelines designed for liquid and gaseous fluids.

In fact, propylene polymers allow one to obtain coatings with high corrosion resistance and optimum mechanical properties.

However, in cases where the pipes thus coated are to be used for marine pipelines there is often the need for additional external layers of heavy materials, particularly concrete, in order to keep said pipelines from floating.

For example, polyolefin compositions, optionally containing elastomeric polymers, having a high specific weight are described in European patent application EP-A-673966. The polyolefin compositions described in the above mentioned patent application are suitable for coating displaying a good balance of weight, corrosion resistance, and high mechanical properties, rendering unnecessary the further addition of layers of other heavy materials, such as concrete, that are subject to breaking and at times are difficult to apply to the pipes.

The need has now been found for materials that compared to the materials already known provide better mechanical properties while having high weight and being corrosion resistant. In particular, the need is for a material with high elongation at break, good elasticity and impact strength.

In response to the above mentioned needs, the Applicant perfected polyolefin compositions having thermoplastic and elastomeric properties, containing high quantities of heavy mineral fillers, easy to apply to the outside surface of metal pipes, allowing the application of single or multiple layers, and possessing the above mentioned balance of properties.

The multi-layer coatings can comprise layers of plastic materials with different properties, such as expanded plastics.

It has been noticed that in order to obtain the required results the compositions must contain a limited maximum quantity of an elastomeric copolymer in order for the compositions to adhere to the pipe to which they are applied; on the other hand, if the quantity of elastomeric copolymer is too low, the desired balance of mechanical properties is not obtained.

Therefore, object of the present invention are polyolefin compositions comprising:
(A) 60%–90%, preferably 65%–90%, more preferably 75%–85% by weight of at least one heavy mineral filler having a specific weight greater than or equal to 3, such as $BaSO_4$, or zirconium silicates;
(B) 10–40%, preferably 10–35%, more preferably 15–25% by weight of a heterophasic polyolefin composition (having thermoplastic and elastomeric properties); and
(C) a compatibilizer for fillers in quantities ranging from 0.1% to 4%, preferably 0.2%–2% by weight with respect to the weight of components (A)+(B);

said composition (B) comprising (weight percentage):
1) 30–60% of a propylene homopolymer fraction, said fraction being more that 80% insoluble in xylene at ambient temperature, or a copolymer of propylene with ethylene and/or a $C_4$–$C_{10}$ α-olefin, containing more than 80% propylene, and being more than 80% insoluble in xylene at ambient temperature (Fraction 1°);
2) 40–70% of a fraction of a copolymer of ethylene with propylene and/or a $C_4$–$C_{10}$ α-olefin, and optionally minor quantities of a diene; said copolymer containing from 15 to 70% of ethylene, and being soluble in xylene at ambient temperature (Fraction 2°); and
3) 0–30%, with respect to the sum of Fractions (1°) and (2°), of a copolymer fraction containing ethylene, said fraction being insoluble in xylene at ambient temperature (Fraction 3°).

Said compositions have a flow index (ASTM D1238, condition L, MIL) ranging from 0.5 to 10 g/10 minutes, preferably from 0.7 to 6 g/10 minutes, elongation at break (ASTM D 638) from over 100% to 800%, preferably from 120 to 550%, and flexural modulus (ASTM D 790) from 100 to less than 3,000 MPa, preferably from 100 to 2700 MPa.

The solubility and insolubility of the polymers of the present invention are defined as fractions soluble or insoluble in xylene at ambient temperature, i.e., around 25° C. (see note 1). The above mentioned compositions can easily be applied to the exterior surface of metal pipes by using extrusion techniques known in the art, because they have a sufficiently high viscosity in the molten state, and therefore can withstand the tensions to which they are subjected during traditional coating processes without melt fracture.

In order to obtain an optimum adhesion to the pipe surface, it is preferable that prior to the application of the compositions of the invention said surface be coated with a layer of a hot melt composition of the type commonly used in the art (such as one based of polypropylene grafted with maleic anhydride).

Heterophasic composition (B) preferably has a propylene content in the copolymers of Fraction 1° ranging from 90 to 99% by weight. The polymer fraction insoluble in xylene in said Fraction 1° more preferably ranges from 85 to 99% in the case of homopolymers, and from 85 to 95% in the case of copolymers.

Examples of the above mentioned $C_4$–$C_{10}$ α-olefins present in composition (B) are 1-butene, 1-pentene, 4-methyl-1-pentene, 1-hexene, and 1-octene. The preferred comonomer is 1-butene.

When present, the diene in composition (B) preferably ranges from 1 to 10%, more preferably 2.5–7% by weight with respect to the total weight of Fraction 2°. Examples of dienes are butadiene, 1,4-hexadiene, 1,5-hexadiene, and 5-ethylidene-2-norbornene.

When present, said Fraction (3°) preferably exceeds 1% by weight, more preferably ranging from 1 to 25% by weight with respect to the sum of Fractions (1°) and (20°). Preferably the content of ethylene in Fraction (3°) is at least 75% by weight, more preferably 80% by weight, with respect to the total weight of Fraction (3°). The comonomers in the copolymer of Fraction (3°) are preferably the same as those of the copolymer of Fraction (2°). An example of copolymer comprised in Fraction (3°) is an essentially linear semicrystalline copolymer of ethylene with propylene, a specific example of which is linear low density polyethylene (LLDPE).

The above mentioned heterophasic composition can be prepared by blending Fractions (1°), (2°), and optionally (3°) in the molten state, that is to say at temperatures greater than their softening or melting point, or more preferably by sequential polymerization in one or more stages in the presence of a highly stereospecific Ziegler-Natta catalyst. In particular, the catalyst system used comprises (a) a solid catalytic component containing a titanium compound and an electron-donor compound, both supported on magnesium chloride, and (b) an Al-trialkyl compound and an electron-donor compound.

The above mentioned sequential polymerization process for the production of the heterophasic composition comprises at least two stages, where in the first stage the propylene is polymerized to form Fraction (1°), and in the subsequent stages mixtures of ethylene with propylene and/or said $C_4$–$C_{10}$ α-olefin, and optionally diene, are polymerized to form Fraction (2°), and optionally Fraction (3°). The polymerization processes are carried out in liquid, gaseous, or liquid/gas phase. The reaction temperature in the various stages of polymerization can be equal or different, and generally ranges from 40° to 90° C., preferably from 50° to 80° C. for the production of Fraction (1°), and from 40° to 60° C. for the production of Fraction (2°) and optionally Fraction (3°).

Examples of sequential polymerization processes are described in European patent applications EP-A-472946and EP-A-400333.

As a way of example, the heterophasic composition has MIL values ranging from 0.1 to 20 g/10 min, preferably from 0.2 to 15 g/10 min. The heterophasic composition with said melt index values can be obtained directly during the polymerization process; as an alternative, said heterophasic composition can be subjected to a chemical visbreaking process carried out in the presence of the appropriate visbreaking agents, such as peroxides. Said chemical visbreaking process is carried out according to well known methods.

Among the above mentioned compositions those that are particularly adequate for the preparation of the compositions of the present invention are the polyolefin compositions (B') comprising (weight percentage):

1) 30–50% of said Fraction (1°) (Fraction 1);
2) 50–70% of said Fraction (2°) where the quantity of ethylene in the copolymer is lower than 40%, preferably from 20 to 38% (Fraction 2); and
3) 0–20% of said Fraction (3°) (Fraction 3).

In said composition (B') the weight percentage of the sum of fractions (2) and (3) with respect to the total composition ranges from 50 to 90%, preferably from 65 to 80%, and the weight ratio (3)/(2) is lower that 0.4, preferably ranging from 0.08 to 0.3. As a way of example, the total quantity of ethylene in heterophasic composition (B') ranges from 15 to 35% by weight.

Other examples of the above mentioned compositions (B) that can be used in the present invention are the polyolefin compositions (B") comprising (weight percentage):

I) 40–60% of said Fraction (1°) (Fraction I);

II) 40–60% of said Fraction (2°) where the quantity of ethylene in the copolymer ranges from 40% to 70% (Fraction II); and
III) 0–25% of said Fraction (3°) (Fraction III).

As a way of example, the total content of polymerized ethylene in said composition (B") ranges from 20 to 60% by weight.

The molecular weight of the various fractions of composition (B") (determined by measuring the intrinsic viscosity in tetrahydronaphtalene at 135° C.) varies in function of the nature of the components, and the total melt index of the composition. In particular, the intrinsic viscosity is preferably comprised between the following limits:

–0.5–3 dl/g for Fraction (I), and
–2–8 dl/g for Fraction (II) plus Fraction (III).

Examples of heterophasic polyolefin compositions (B') and (B") are described respectively in the above mentioned European Patent applications EP-A-0 472946and EP-A-400 333.

The above mentioned compatibilizers for fillers are preferably selected, for example, from stearic acid derivatives, such as inorganic stearates and stearamides, such as Ca and Zn stearates.

Further examples of fillers' compatibilizers different from the stearic acid derivatives are the polypropylene grafted with maleic anhydride or with other graftable compounds containing carboxylic groups, and systems based of vinyl-substituted alkoxysilanes and peroxides. The compositions of the present invention can be prepared by using techniques known in the art for the preparation of polyolefin polymer blends with fillers. For example, one can use Banbury, Buss, or Brabender mixers at temperatures ranging from 180° C. to 260° C.

The following examples are given in order to illustrate but not limit the present invention. The methods used to obtain the data relative to the properties reported in the examples and the description are listed below.

| Property | Method |
| --- | --- |
| Melt Index (MIL) | ASTM-D 1238, condition L |
| Solubility in xylene | (see note 1 below) |
| Flexural Modulus (FM) | ASTM D 412 |
| Tensile strength at 23° C. | ASTM D 638 |
| Yield stress at 23° C. | ASTM D 638 |
| Elongation at break at 23° C. | ASTM D 638 |
| Elongation at yield at 23° C. | ASTM D 638 |
| Density | B. S. 4370 |
| Notched impact strength (Izod) | ASTM D 256 |

Note 1

Determination of percentage soluble in xylene: a solution is prepared of the sample in xylene at a concentration of 1% by weight, while the sample is maintained under agitation in xylene for one hour at 135° C. Continuing to stir, the content is allowed to cool to 95° C., after which the solution is poured into a 25° C. bath, and left there for 20 minutes without stirring, and for 10 more minutes under stirring conditions. The solution is then filtered, and acetone is added to a portion of the filtrate in order to obtain the precipitation of the dissolved polymer. The polymer thus obtained is then recovered, washed, dried, and ultimately weighed in order to determine the percentage soluble in xylene.

Components Used in the Examples and Comparative Examples

The following heterophasic compositions (B) (i)–(iii) are obtained by way of sequential polymerization in the presence of a high yield, highly stereospecific Ziegler-Natta catalyst supported on $MgCl_2$.

Heterophasic composition (i) having a MIL of 0.6 g/10 min comprising (weight parts and percentages):
1) 33 parts of a crystalline propylene random copolymer with 4.3% of ethylene; the copolymer containing about 9% of a fraction soluble in xylene at 25° C., and having an intrinsic viscosity [η] of 1.5 dl/g;
2) 61 parts of an ethylenelpropylene amorphous copolymer containing 30% of ethylene, totally soluble in xylene at 25° C., and having an intrinsic viscosity [η] of 3.2 dl/g; and
3) 6 parts of an essentially linear ethylene/propylene copolymer totally insoluble in xylene at 25° C.

Elastomeric composition (ii) having a MIL of 0.8 g/10 min comprising (weight parts and percentages):
I. 40 parts of a crystalline propylene homopolymer having a xylene insoluble fraction of 97.5%, and MIL of 9 g/10 min;
II. 47 parts of an amorphous ethylene/propylene copolymer, containing 50% of ethylene, totally soluble in xylene at 25° C., and having an intrinsic viscosity [η] of 3.7 dl/g; and
III. 13 parts of an essentially linear ethylene/propylene copolymer totally insoluble in xylene at 25° C.

Elastomeric composition (iii) having a MIL of 10.5 g/10 min comprising (weight percentages):
67% of a crystalline propylene random copolymer containing 3% of ethylene, having a MIL of 32 g/10 min;
27% of an ethylene/propylene copolymer soluble in xylene at 25° C. containing 55% of ethylene, and having an intrinsic viscosity [η] of 2.35 dl/g; and
6% of an ethylene/propylene copolymer insoluble in xylene at 25° C.

Polymer (iv): propylene random copolymer comprising (by weight) 3.5% of ethylene, and 6% of 1-butene, having a MIL of 5.5 g/10 min, and melt point of 132° C. (determined by DSC).

Polypropylenes (v) and (vi): crystalline propylene homopolymers containing 96% of a fraction insoluble in xylene at ambient temperature, and having a MIL of 6 and 10 g/10 min respectively.

Irganox B 225: 50% by weight of pentaerythritol-tetrakis [3(3,5-di-tert-butyl-4-hydroxyphenyl)]propionate (Irganox 1010)+50% by weight of bis(2,4-di-tert-butylphenyl)phosphite (Irgafos 168), marketed by Ciba-Geigy.

EXAMPLES 1–5,

Comparative Examples 1c–3c

In a Buss 200 mixer are introduced the materials indicated in Table 1. The mineral filler is barium sulfate (sp. w.=4.4).

The above mentioned materials are extruded in the Buss at a temperature of 230° C. Part of the composition thus obtained is used in an extrusion test using a single screw extruder with a flat die at a temperature of about 190° C., obtaining a homogeneous extrudate, and without melt fracture problems. The results prove that the composition is adequate for the use in pipe coating processes by way of extrusion.

In order to determine the mechanical properties, an other portion of the composition is used for the preparation of 120 mm×120 mm×3 mm specimens by way of injection molding at 230° C. The MIL value, density, and mechanical characteristics of the above mentioned compositions are reported in Table 2.

TABLE 1

| | Examples and comparative examples | | | | | | | |
|---|---|---|---|---|---|---|---|---|
| | 1 | 2 | 3 | 4 | 5 | 1c | 2c | 3c |
| Barium sulfate % | 76 | 75.5 | 80 | 85 | 75.5 | 75.5 | 75.5 | 76 |
| Elastom. Comp. (i) % | 23.4 | 23.5 | 18.9 | 13.9 | 0 | 0 | 0 | 0 |
| Elastom. Comp. (ii) % | 0 | 0 | 0 | 0 | 23.5 | 0 | 0 | 0 |
| Elastom. Comp. (iii) % | 0 | 0 | 0 | 0 | 0 | 23.5 | 0 | 0 |
| Polymer (iv) % | 0 | 0 | 0 | 0 | 0 | 0 | 23.5 | 0 |
| Polypropylene (v) % | 0 | 0 | 0 | 0 | 0 | 0 | 0 | 21.5 |
| Polyproplene (vi) % | 0 | 0 | 0 | 0 | 0 | 0 | 0 | 2 |
| Calcium Stearate % | 0.5 | 0.5 | 0.8 | 0.8 | 0.5 | 0.5 | 0.5 | 0.5 |
| Irganox B225 % | 0.1 | 0.5 | 0.3 | 0.3 | 0.5 | 0.5 | 0.5 | 0 |

TABLE 2

| | Examples and comparative examples | | | | | | | |
|---|---|---|---|---|---|---|---|---|
| | 1 | 2 | 3 | 4 | 5 | 1c | 2c | 3c |
| MIL g/10 min | 0.93 | 1.3 | 3.1 | 1.4 | 0.63 | 8.4 | 7.9 | 5.3 |
| FM MPa | 380 | 305 | 455 | 510 | 1020 | 1920 | 3710 | 5000 |
| Yield stress % | 4.7 | 4.3 | 4.8 | 4.9 | 6.4 | 9.2 | 12.8 | — |
| Tensile strength % | — | 7 | — | — | — | — | — | — |
| Elongation at yield % | — | 7 | — | — | — | — | — | — |
| Elongation at break % | 440 | 450 | 375 | 355 | 220 | 10 | 20 | 45 |

TABLE 2-continued

|  | Examples and comparative examples | | | | | | | |
|---|---|---|---|---|---|---|---|---|
|  | 1 | 2 | 3 | 4 | 5 | 1c | 2c | 3c |
| Izod at 23° C. J/m | NR[1] | NR[1] | NR[1] | NR[1] | 452 | 252 | 64 | — |
| Density g/ml | 2.19 | 2.12 | 2.4 | 2.55 | 2.19 | 2.2 | 2.43 | 2.2 |

[1]The specimen does not break.

What is claimed is:

1. A polyolefin composition comprising:
   (A) 60–90% by weight of at least one heavy mineral filler with a specific weight greater than or equal to 3;
   (B) 10–40% by weight of a non-crosslinked heterophasic polyolefin composition; and
   (C) a compatibilizer for fillers in quantities ranging from 0.1% to 4% by weight with respect to the weight of components (A)+(B):
   said composition (B) being characterized in that it comprises (weight percentages):
   1°) 30–60% of a propylene homopolymer fraction with an insolubility in xylene at ambient temperature of greater than 80%, or a copolymer of propylene with ethylene or a $C_4$–$C_{10}$ α-olefin or combinations thereof, containing more than 80% of propylene, and having an insolubility in xylene at ambient temperature of greater than 80% (Fraction 1°);
   2°) 40–70% of a copolymer fraction of ethylene with propylene or a $C_4$–$C_{10}$ α-olefin or combinations thereof, and optionally minor quantities of diene; said copolymer containing from 15 to 70% of ethylene, and being soluble in xylene at ambient temperature (Fraction 2°); and
   3°) 0–30%, with respect to the sum of Fractions (1°) and (2°), of a copolymer fraction of ethylene with propylene or a $C_4$–$C_{10}$ α-olefin or combinations thereof, containing at least 75% of ethylene, said fraction being insoluble in xylene at ambient temperature (Fraction 3°);
   wherein the polyolefin composition comprising components (A), (B), and (C) has a flow index from 0.5 to 10 g/10 minutes, an elongation at break of from over 100% to 800%, and a flexural modulus from 100 to less than 3,000 MPa.

2. Composition of claim 1 where the compatibilizer is selected from stearic acid derivatives.

3. Polyolefin composition of claim 1 where composition (B) comprises (weight percentages):
   1) 30–50% of said Fraction (1°);
   2) 50–70% of said Fraction (2°) where the quantity of ethylene in the copolymer is lower than 40%; and
   3) 0–20% of said Fraction (3°).

4. Polyolefin composition of claim 1 where composition (B) comprises (weight percentages):
   I) 40–60% of said Fraction (1°);
   II) 40–60% of said Fraction (2°) where the quantity of ethylene in the copolymer ranges from 40% to 70%; and
   III) 0–25% of said Fraction (3°).

5. Composition of claim 1 where the heavy mineral filler (A) is $BaSO_4$, or Zr silicates.

6. Process for using the compositions of claim 1 for coating the outside surface of metal pipes by the step of extruding.

7. Metal pipes whose outside surface is coated with a layer of the compositions of claim 1.

8. Polyolefin composition of claim 3 wherein, in said Fraction (2°), the quantity of ethylene in the copolymer is from 20 to 38%.

* * * * *